C. E. SACKETT.
Cultivators.

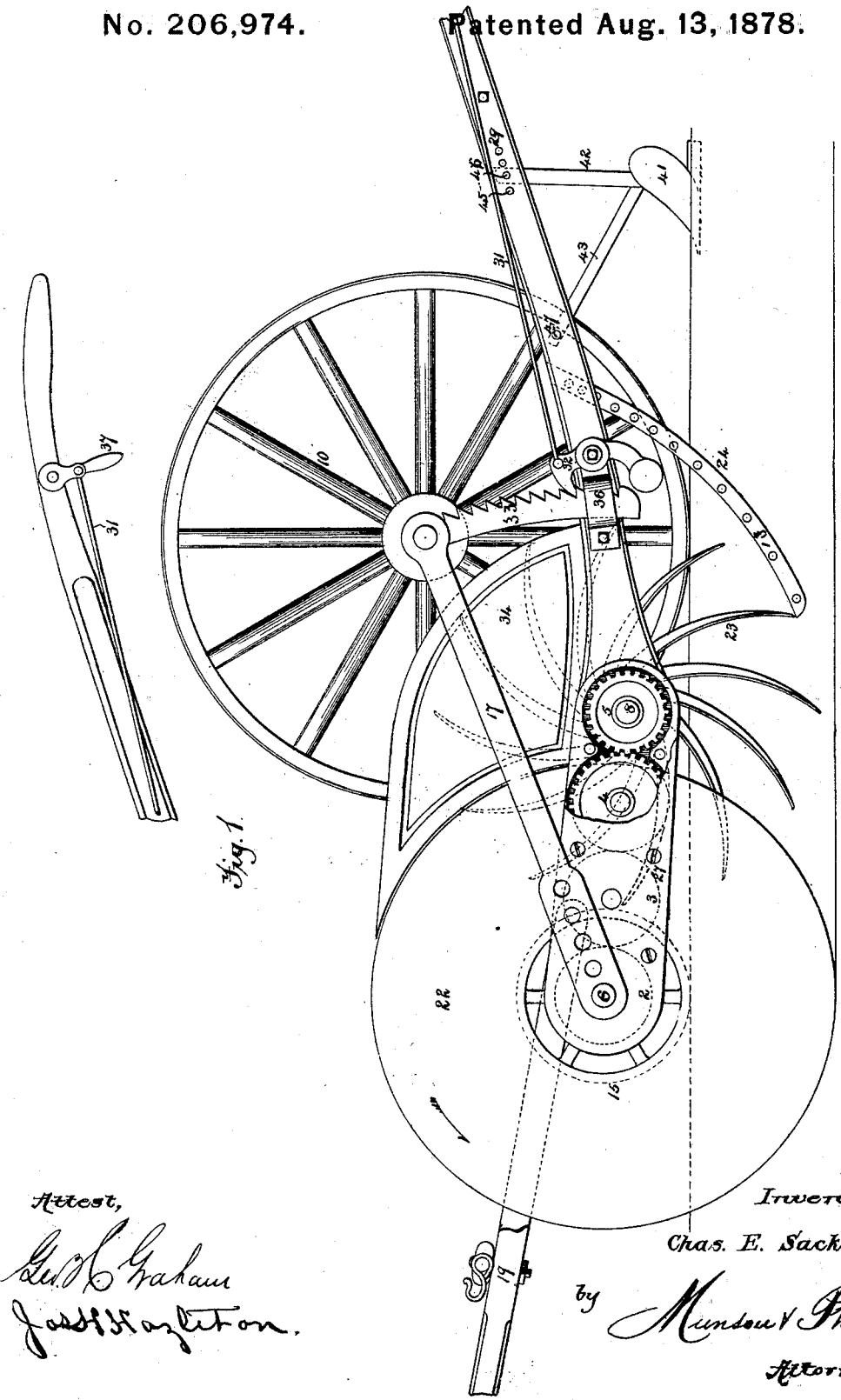

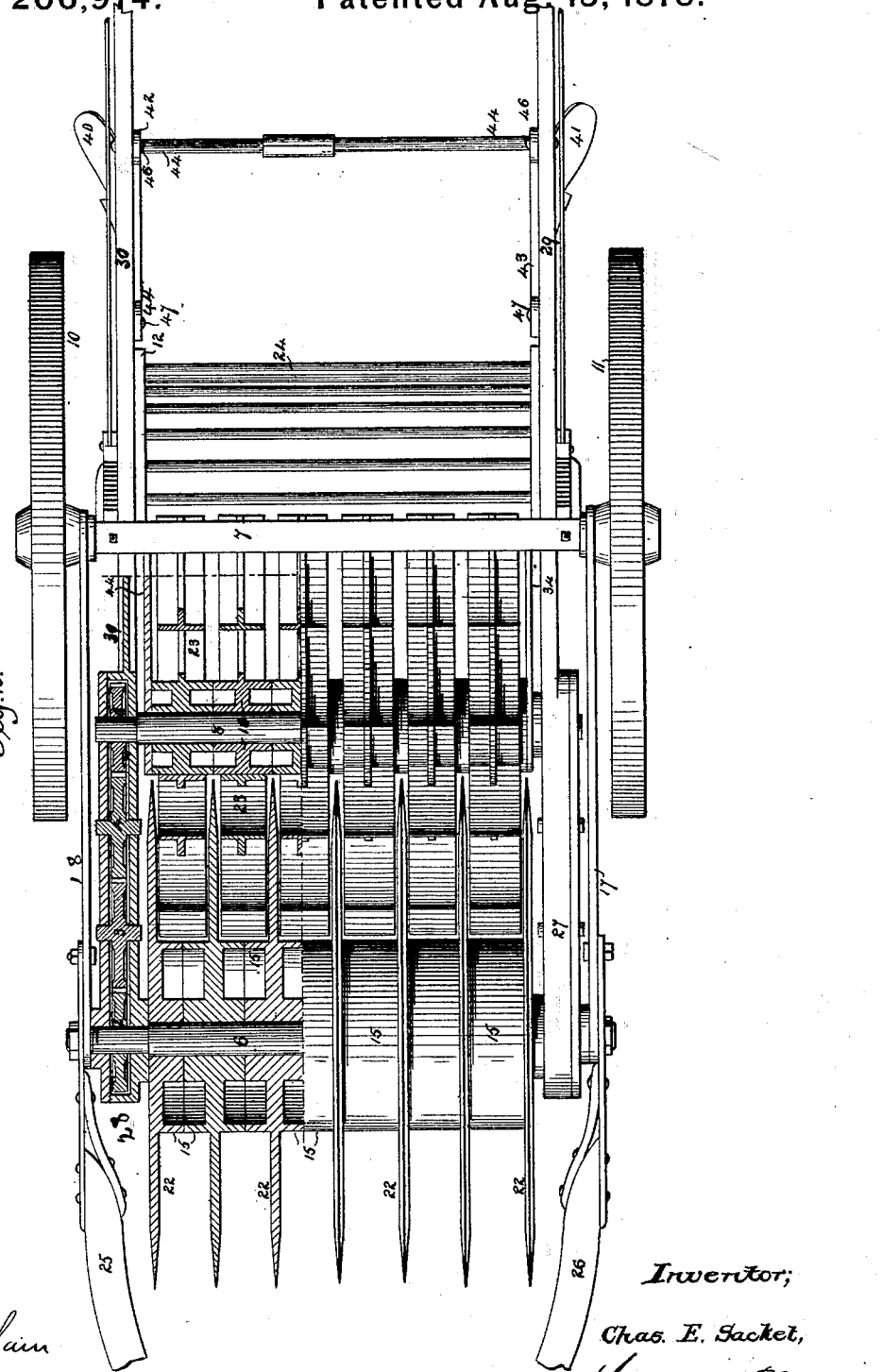

No. 206,974.   Patented Aug. 13, 1878.

Attest:
Geo. H. Graham
Jos. H. Hazleton.

Inventor:
Chas. E. Sacket,
by Munson & Philipp
Attorneys.

UNITED STATES PATENT OFFICE.

CHARLES E. SACKETT, OF MATILDA FURNACE, WAYNE TOWNSHIP, MIFFLIN COUNTY, PENNSYLVANIA.

IMPROVEMENT IN CULTIVATORS.

Specification forming part of Letters Patent No. 206,974, dated August 13, 1878; application filed June 22, 1878.

*To all whom it may concern:*

Be it known that I, CHARLES E. SACKETT, of Matilda Furnace, Wayne township, Mifflin county, and State of Pennsylvania, have invented certain new and useful Improvements in Cultivators; and I do hereby declare that the following specification, in connection with the accompanying drawings, is a full, clear, and exact description of the same.

Figure 5:
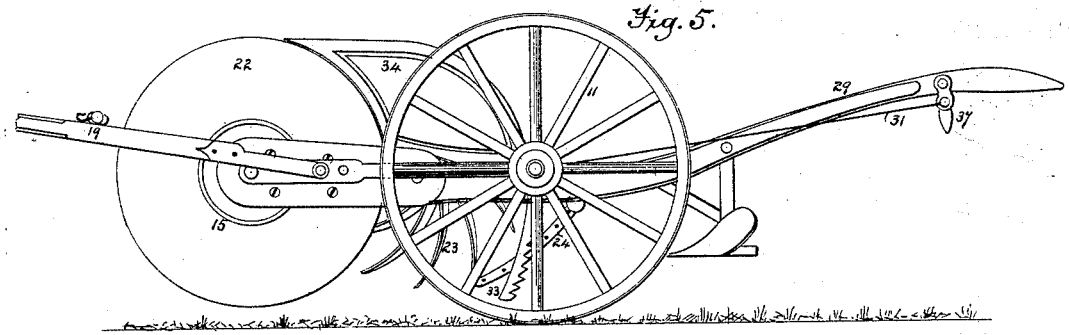
Figure 4:
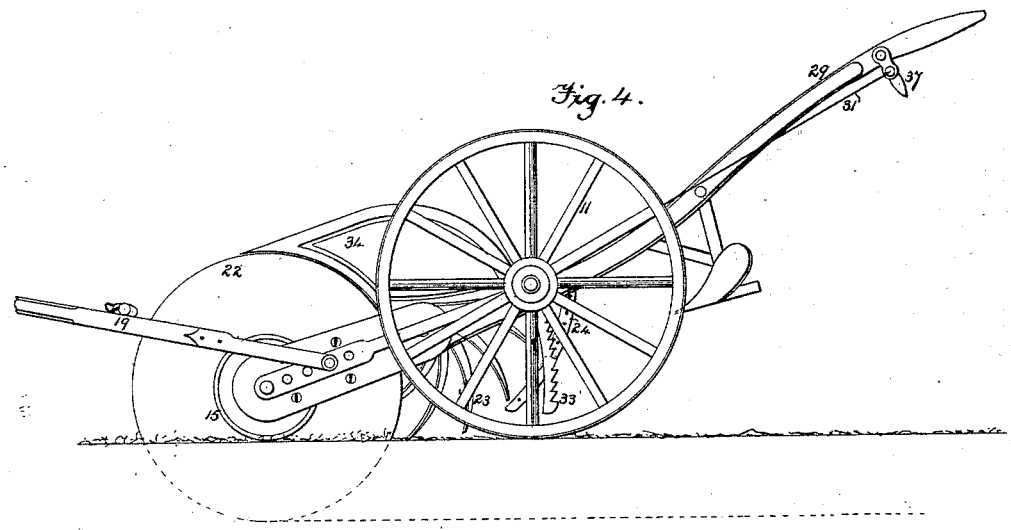
Figure 3:
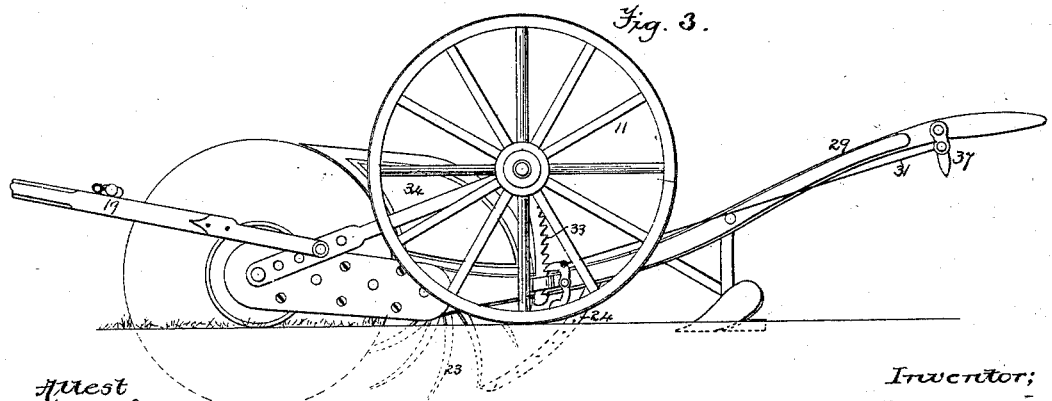

In said drawings, Figure 1 is a side elevation with one of the supporting-wheels omitted; Fig. 2, a plan or top view, being in part a longitudinal section through the revolving cutter and revolving spade; and Figs. 3, 4, and 5 are side elevations upon a reduced scale, showing the manner of manipulating the implement.

This invention relates to that class of agricultural implements which are designed to prepare the earth either for planting or to promote the growth of crops.

It consists in a tilling implement the principal elements of which are a revolving cutter which divides the ground vertically, and a revolving spade which divides the ground horizontally, and a stationary inclined sifting-grate, by the operation of which devices the functions of a plow, harrow, and cultivator are simultaneously carried on, and the ground is divided, broken up, and disseminated in a loose pile, being thus thoroughly tilled at one continuous operation of a single machine.

The invention further includes combinations of parts and details of construction, all of which will be hereinafter more fully set forth and specifically claimed.

The revolving cutter consists of a series of circular knives, 22, which are fixed a suitable distance apart upon a common shaft, 6. As herein shown, each cutter is cast in one piece, with projecting hubs 15, which determine their distance of separation and constitute supporting-rollers, which run upon the surface of the ground. These rollers might be cast as separate pieces, and both cutters and rollers fixed upon said shaft by a spline or other common means.

The edges of the cutters may be an even knife-edge or have the form of sharpened serrated teeth.

The revolving spade consists of a number of members, secured side by side upon a common shaft, 8, each of which is formed of several curved blades, 23, which spring from a central hub, 16. These blades are sharp at their extremities, and provided with one or more strengthening-ribs on their backs.

The shafts 6 and 8 are journaled in side frames, so that the blades 23, which are of a width equal to the space between the cutters 22, shall extend a considerable distance into and in their rotation play between said cutters, the hubs 16 being made long enough so that while abutting against each other they provide a space between the blades 23 of adjacent members of the revolving spade in which the knives 22 play.

The revolving cutter rotates in the direction of its arrow, and by means of a toothed wheel, 2, fast on the shaft 6, and another, 5, fast on the shaft of the revolving spade, and intermediates 3 and 4, all of which are inclosed in and protected by boxes 27 28, forming a part of the side frames, imparts a reverse rotation to said revolving spade. These gears may be duplicated on either side.

A sifter, 24, which consists of side bars 12 13 and a number of cross bars or rods fixed thereto, so as to provide spaces between them, which are narrow at the upper end and gradually increase so as to be quite wide at the lower end, is rigidly attached to the side frame, so that the lower ends of the blades of the revolving spade shall just clear its lower end, while its upper end shall be a considerable distance in the rear of the path swept by said blades.

The shaft of the revolving cutter is connected, by means of draft-bars 17 18, with an axle, 7, which carries a pair of wheels, 10 11. The spindles of this axle 7 may project from outside the draft-bars 17 18 at any desired point, to secure a proper fulcrum and a proper division of the total weight of the machine, so that it shall be easily balanced when suspended from the axle 7, and from this axle depends a ratchet-segment, 33, which passes through a guide-loop, 36, on the side frame. The attached end of this segment-ratchet 35 may be reversed and attached to the side levers, passing upward through the guide-loops 36, attached to the axle 7 and draft-bars 17 18. A weighted dog, 32, attached to the guide-loop, engages the teeth of this ratchet, and thus determines the position of the side frames, which swing on the shaft 6, and the revolving spade and sifter, which they support, with respect to the revolving cutter and the wheels 10 11.

This implement may be operated by means of handles 29 30, which extend rearward from its side frames, or by means of shafts 25 26 or a tongue, 19, the hounds of which are attached to the draft-bars 17 18 at a proper one of the attaching-holes to secure the requisite thrust of the revolving cutter.

The dog 32 is shown as provided with a connecting-rod, 31, and a lever, 37, hung near the end of one of the handles, whereby it may be conveniently manipulated, and thereby enable the operator to control the degree to which the revolving spade shall penetrate the ground, according to the toughness of the soil or the depth of cultivation required.

The operation of the implement is as follows: As it is carried over the ground, either by pushing it through the handles, drawing it by the shafts or tongue, or propelling it by steam-power, the revolving cutter will, by its own weight, the thrust of the power propelling it, and its rotary motion, enter the ground and divide or slice it by vertical cuts into narrow sections. The blades of the revolving spade will enter these narrow sections horizontally, and thus divide them into narrow wedge-like pieces, which, being removed by the blades, will be lifted, carried upward and rearward by them, guided by the side plates 34 44, and dumped onto the sifter. The soil will thus all be removed to the depth to which these blades penetrate, and when deposited upon the inclined sifter 24 will be distributed through it in the following manner: All coarse material, the larger stones, weeds, tufts of grass, straw from manure, stalks, and unbroken clods of earth, being of a size or such a nature as not to pass through the narrower spaces between the bars of the sifter, will work down over its bars, and either pass through those at the lower end or be swept off from the bottom of the sifter into the furrow by the blades of the revolving spade, which pass nearly in contact with it at that point. The result will be that the subsoil will be spread with a layer of coarse material that will virtually underdrain the field, for one season at least, the stones of any considerable size will be out of the way of growing crops, the weeds and stubble will be buried where they will decompose to the best advantage, and the soil will be distributed on top of them in a light porous mass from the coarsest below to the finest on top, in regular gradation. All of the soil will thus have been exposed to the great fertilizer—the air—and be left in a condition for the air to readily permeate it.

When the end of the field is reached or the implement is to be raised clear of its furrow in which it rests, as shown in Fig. 3, the handles are raised upward, carrying with them the revolving spade, which is thus withdrawn from the soil, until they bear under the axle 7, where they are held by means of the levers, dogs, and ratchet-bars, as in Fig. 4. As the revolving spade is comparatively light, and this movement withdraws its blades from the soil, and the handles then form a lever of the second kind, whose fulcrum is the rollers 15, this operation becomes an easy one. The handles are then depressed, acting as a lever of the first order with the wheels 10 11 for their fulcrum, thus raising the revolving cutter clear of the soil, as in Fig. 5. The whole implement now rests upon the wheels 10 11, being balanced in position by the guiding hands of the operator, and may be wheeled in any direction and turned about upon very short curves.

If a field composed of tough sod or clay is to be tilled, it may be necessary to go over the field one or more times with the revolving cutter alone depressed, as in Fig. 4, and then with the revolving spade depressed a slight distance. All of these operations are completely within the control of the operator, who may adjust the revolving spade at will through the dog and ratchet.

For cultivating, the full depth of the revolving spade may be used, and for this purpose the value of the implement is very evident, as its cutter and spade can operate close to the roots of the plants without danger of upturning or burying them, while the earth between them is completely distributed and rendered loose, thereby affording great protection against drought; and in order that, when the implement is used for cultivating purposes, the rows of plants may be properly hilled, I have provided a hilling attachment, which consists of a pair of plows or hoes, 40 41, detachably secured to the handles 29 30 by rods 42, braces 43 44, and fastening-bolts 46 47. It may thus be adjusted in proper relation to the handles by securing the ends of the rods 42 in the proper one of many holes, 45, in said handles. When this hilling implement is used the finely-distributed top-dressing of earth will be turned upon either side against the rows of plants, thus forming a proper hill against the same.

I claim—

1. In a tilling implement, the combination of a revolving cutter, a revolving spade, and a sifting-grate, substantially as described.

2. In a tilling implement, the combination of a revolving cutter, a revolving spade, a sifting-grate, and a hilling attachment, substantially as described.

3. In a rotary tilling implement, the combination, with the revolving cutter and revolving spade, of the side frames 27 28, forming bearings for their journals, and boxes which inclose the driving-train of gear-wheels connecting the two shafts, and forming, with the handles 29 30, levers for controlling the depth of the spade and cutter and for lifting them from the earth either separately or jointly, substantially as shown and described.

4. In a tilling implement, a revolving cutter, revolving spade, wheels 10 11, side frames 27 28 and handles 29 30, the connecting-bars 17 18, and ratchet-segment 33, combined and arranged substantially as shown and described, whereby said frames and handles may act as levers of the first and second orders alternately in controlling the movements of the implement.

5. In a tilling implement, substantially as shown and described, the combination, with the revolving cutter and revolving spade, wheels 10 11, side levers, and handles, of the draft-bars 17 18, which move independently of the side frames or levers, and to which the draft shall be applied at one of the adjustable attaching-holes, whereby the thrust of the revolving cutter into the earth is regulated and the fulcrum of the wheels 10 11 may be varied along said bars to raise the revolving cutter, substantially as described.

6. In a tilling implement, a revolving cutter and a revolving spade combined together for conjoint operation, the said parts being constructed and hung with relation to each other so that the spades shall play within the spaces afforded between the cutters and the cutters shall run close to the axis of said spade, whereby the earth lifted by the spades shall be confined thereon, substantially as described.

In testimony whereof I have signed my name to this specification in the presence of two subscribing witnesses.

CHARLES E. SACKETT.

Witnesses:
  H. T. MUNSON,
  GEO. H. GRAHAM.